T. J. ALLISON.
DEVICE FOR TEACHING MUSICAL TRANSPOSITION.
No. 183,103. Patented Oct. 10, 1876.
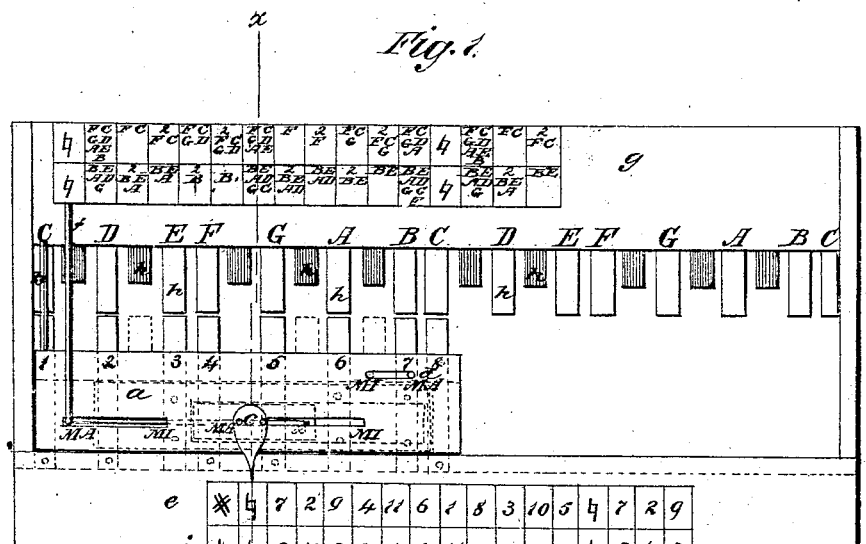
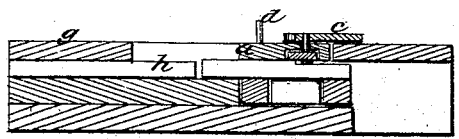
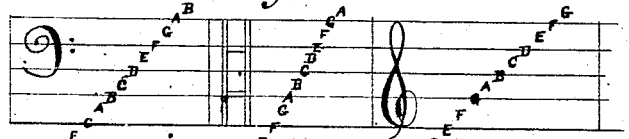
WITNESSES:
Francis McArdle
John Goethals
INVENTOR:
T. J. Allison
BY
ATTORNEYS.
JAMES R. OSGOOD & CO. BOSTON.

UNITED STATES PATENT OFFICE.

THOMAS J. ALLISON, OF GLADEWATER, TEXAS.

IMPROVEMENT IN DEVICES FOR TEACHING MUSICAL TRANSPOSITION.

Specification forming part of Letters Patent No. 183,103, dated October 10, 1876; application filed April 25, 1876.

*To all whom it may concern:*

Be it known that I, THOMAS J. ALLISON, of Gladewater, county of Gregg, and State of Texas, have invented a new and Improved Instrument for Transposing Music, of which the following is a specification:

My invention consists of a key-board with sliding instruments and scales, as hereinafter described.

Figure 1 is a plan view of the instrument. Fig. 2 is a transverse section on line $x\ x$. Figs. 3, 4, and 5 are scales to be placed on the cover to be used in connection with the instrument.

Similar letters of reference indicate corresponding parts.

A is a slide, which contains numbers or characters indicating one octave of the voice part. Under the letters C, D, E, &c., on the board $g$, are keys $h$, which represent the sounds of the letters under which they stand. In the slide $a$ are two smaller slides, $c$ and $d$. To begin with, move the slide $c$ as far to the left as it will go; also move $d$ as far to the right as it will go; then the instrument is prepared to explain the transposition of music written in the major key. (M A.)

Now, move the slide $a$ as far to the left as it will go. The short wire $b$ will then point to C; hence C is the key. We now look at slide $c$, and find that it points to a natural, ♮, hence the piece is in a natural key. Now, if such piece be performed on a keyed instrument, none but white keys will be used, for the sounds in the voice part $a$ will exactly correspond to the sounds made by the white keys on the instrument. Now, if the piece of music which we wish to sing or play has one sharp, (♯,) at the beginning of the tune, we must move the slide $a$ to the right until slide $c$ points to figure 1 in the top line, (the upper row of figures at the bottom $e$ shows the number of sharps, (♯,) and the lower row $j$ shows the number of flats, (♭;) we then look to the short wire $b$, and find that it points to G; hence G is the key. We then look to the wire $f$, and find that it points to F in the upper line on board $g$, for that is the line for sharps; hence it is F that is sharped.

We then look to the keys to see what effect one sharp has, and we find that instead of No. 7 in slide $a$ pointing to F, the seventh letter from the key, it points to F-sharp, the first black note to the right of F.

Therefore, if I should play this piece on an instrument, I would play F-sharp for all notes that occurred on F in the piece. Therefore, I know that there is one sharp at the beginning of a piece of music; the instrument will tell me what letter is sharped, what letter is the key, and what keys must be played on an instrument.

Now, place slide $c$ at figure 2, line $e$, moving $a\ a$ to the left. $b$ will then point to D for a key; $f$ points to F C, which are the letters sharped; and the keys in $a\ a$ show that F and C are to be played or sung a half-step higher than their natural sound, and so on for all other positions of the key.

When flats are used, pay no regard to the upper line either of figures or letters, but use the lower ones.

In explaining the minor key, move the slide $c$ to the right and $d$ to the left, and proceed as before.

I will have a lid to the instrument, the same being attached to the front part, so that when opened it will present instrument as shown in Fig. 1, said cover having lines drawn on the under side to be brought to view when opened with letters placed thereon, as in Fig. 3, showing how the staff is lettered according to each of cleffs F, C, and G, or bass, tenor, and treble, and also having lines drawn, as in Fig. 4, representing the general scale or connection of the different parts in music.

And, also, when the scale is made large enough to admit, said cover will have lines drawn thereon, which, with the proper characters, will show the position of the key at each transposition as far as four flats or four sharps. When the instrument is made large, I will have the lid in two parts, closing in the middle—one opening to the right and the other to the left.

In Fig. 4 the upper notes show the place of the major key, and the lower row the place of the minor.

Having thus described my invention, I claim as new and desire to secure by Letters Patent—

The improved instrument herein described, for the transposition of the key in music, consisting of the slide $a$, containing figures or characters indicating one octave of the voice part, slides $c$ and $d$, and rods $b$ and $f$, combined with the keys $h$, scales $g$, and $e\ j$, substantially as and for the purpose described.

THOMAS JEFFERSON ALLISON.

Witnesses:
    J. L. MACKEY,
    C. B. MACKEY.